United States Patent
Demmler et al.

(10) Patent No.: US 11,463,445 B2
(45) Date of Patent: *Oct. 4, 2022

(54) SYSTEMS AND METHODS FOR ROLE-BASED PERMISSION INTEGRATION

(71) Applicant: Open Text SA ULC, Halifax (CA)

(72) Inventors: Thomas Demmler, Constance (DE); Szabolcs Gyula Mile, Munich (DE)

(73) Assignee: OPEN TEXT SA ULC, Halifax (CA)

( * ) Notice: Subject to any disclaimer, the term of this patent is extended or adjusted under 35 U.S.C. 154(b) by 93 days.

This patent is subject to a terminal disclaimer.

(21) Appl. No.: 17/020,665

(22) Filed: Sep. 14, 2020

(65) Prior Publication Data
US 2020/0412737 A1 Dec. 31, 2020

Related U.S. Application Data

(63) Continuation of application No. 15/962,840, filed on Apr. 25, 2018, now Pat. No. 10,778,692.

(51) Int. Cl.
*H04L 9/40* (2022.01)
*G06Q 10/10* (2012.01)

(52) U.S. Cl.
CPC ......... *H04L 63/104* (2013.01); *G06Q 10/105* (2013.01); *H04L 63/102* (2013.01)

(58) Field of Classification Search
CPC ... H04L 63/104; H04L 63/102; G06Q 10/105; G06Q 10/10; G06F 21/604; G06F 21/6218; G06F 2221/2141
See application file for complete search history.

(56) References Cited

U.S. PATENT DOCUMENTS

| | | | |
|---|---|---|---|
| 6,453,353 B1 | 9/2002 | Win et al. | |
| 10,778,692 B2* | 9/2020 | Demmler | G06F 21/6218 |
| 2002/0169876 A1 | 11/2002 | Curie et al. | |
| 2006/0242685 A1* | 10/2006 | Heard | H04W 12/35 726/3 |
| 2007/0142039 A1 | 6/2007 | Bushnell et al. | |

(Continued)

OTHER PUBLICATIONS

Rathnasekara et al.; "Securing Corporate Data in Mobile Devices in a COPE Environment", Jan. 27, 2017, IEEE, pp. 120-125. (Year: 2017).*

(Continued)

*Primary Examiner* — Matthew Smithers
(74) *Attorney, Agent, or Firm* — Sprinkle IP Law Group

(57) ABSTRACT

A content server can extend enterprise content management to a leading system in an efficient, automated, and seamless manner by leveraging the permission information provided by the leading system. The content server can sync the permission information with the leading system, evaluate user-manager relations, role-based rule definitions, and user-group associations defined in the leading system, and determine and/or update role memberships for workspaces created in the content server for users in the leading systems. In this way, even though the content server and the leading system have very different types of roles and permission models, the content server can evaluate complex relationships and role-based rules and intelligently, correctly, and quickly assign the right people to the right roles in the right workspaces in the content server.

20 Claims, 8 Drawing Sheets

(56) References Cited

U.S. PATENT DOCUMENTS

| | | | |
|---|---|---|---|
| 2007/0156601 | A1 | 7/2007 | Brew et al. |
| 2013/0013560 | A1* | 1/2013 | Goldberg .............. G06F 16/178 |
| | | | 707/634 |
| 2013/0138608 | A1* | 5/2013 | Smith ..................... G06F 16/27 |
| | | | 707/610 |
| 2013/0212707 | A1* | 8/2013 | Donahue ............. G06F 21/6218 |
| | | | 726/29 |
| 2013/0297614 | A1 | 11/2013 | Leinberg et al. |
| 2014/0222914 | A1* | 8/2014 | Ebner ................... H04L 67/306 |
| | | | 709/204 |
| 2014/0278631 | A1 | 9/2014 | Karuppusamy |
| 2015/0350222 | A1 | 12/2015 | Sashimoto et al. |
| 2016/0071032 | A1 | 3/2016 | Hunter |
| 2016/0098572 | A1 | 4/2016 | Povalyayev et al. |
| 2016/0110374 | A1 | 4/2016 | Wetherall et al. |
| 2017/0278631 | A1 | 9/2017 | Choi et al. |
| 2019/0327271 | A1 | 10/2019 | Saxena et al. |
| 2019/0334917 | A1 | 10/2019 | Demmler et al. |

OTHER PUBLICATIONS

"Open Text TM Content Suite Platform," Enterprise Information Management, 2017, 5 pages.

Office Action issued for U.S. Appl. No. 15/962,840, dated Dec. 26, 2019, 10 pages.

Notice of Allowance issued for U.S. Appl. No. 15/962,840, dated May 7, 2020, 7 pages.

\* cited by examiner

FIG. 7

SYSTEMS AND METHODS FOR ROLE-BASED PERMISSION INTEGRATION

CROSS-REFERENCE TO RELATED APPLICATIONS

This application is a continuation of, and claims a benefit of priority under 35 U.S.C. 120 of the filing date of U.S. patent application Ser. No. 15/962,840, filed Apr. 25, 2018, now issued as U.S. Pat. No. 10,778,692, entitled "SYSTEMS AND METHODS FOR ROLE-BASED PERMISSION INTEGRATION," the entire contents of which are hereby expressly incorporated by reference for all purposes.

TECHNICAL FIELD

This disclosure relates generally to the field of data processing by electrical computers for specific applications. More particularly, this disclosure relates to data processing systems, methods, and computer program products for role-based permission synchronization and integration between a leading system and a content server.

BACKGROUND OF THE RELATED ART

Typically, in enterprise computing environments, human resources management (HR) systems manage the relations about employees (e.g., who is an employee's direct manager, which HR administrators are assigned to which employees, and so on). Such HR systems do not manage content. Rather, enterprise content, including unstructured content such as work permit documents, sick leave documents, or social security correspondence emails, are managed by other enterprise class systems, such as Enterprise Content Management (ECM) systems.

Complex permission management is generally required for accessing the unstructured content in an ECM system, which has to take into account the relationships among employees, managers, and HR administrators. However, no automated solutions exist that allow for permission integration between an HR system, which manages relations, and an ECM system, which manages content.

SUMMARY OF THE DISCLOSURE

An object of the invention is to provide an automatic way to leverage relationships managed in a leading system, such as an enterprise HR system, in the permission management of an ECM system.

In some embodiments, this object can be realized in a method for role-based permission integration. The method may be performed by a permission synchronization module running on a content server that implements an ECM system. The method may comprise syncing permission information with a leading system communicatively connected to the content server, for example, through an application programming interface (API). In some embodiments, the permission information may include user-manager relations, role-based rule definitions (or rules), and user-group associations, which are managed and maintained by the leading system's permission management component. Syncing permission information with the leading system allows the content server to replicate the leading system's most up-to-date permission information on user-manager relations, role-based rules, and user-group associations. In some embodiments, the permission synchronization module may operate to sync the permission information with the leading system periodically, on demand, or responsive to an event such as the leading system adding a new user or the content server changing a user's permission to access another user's content server work space.

In some embodiments, the method may further include evaluating the permission information to ascertain relationships among users of the leading system (which, as discussed later, can also be users of the content server) and determine each user's role membership. User-manager relations may include information that describes a first user as a manager or administrator of a second user; role-based rules may include rule definitions associated with the roles defined in the leading system; and user-group associations may describe how one user group is associated with another group (e.g., a particular granted group such as a group of managers and/or administrators in an enterprise's office in North America is associated with a particular target group such as a group of employees working in the same office in North America). The evaluation may include evaluating user-manager relations, role-based rules, and user-group associations to gain knowledge on a user's relation with another user(s), what group the user is in, what that relationship entails per applicable role-based rules, and how to place the user to an appropriate content server workspace(s) of another user or users—a process referred to herein as role membership allocation.

Once the user's role membership is determined, the method may further include updating a content server workspace such that the user can access the content server workspace as permitted by the user's role (e.g., view only, edit, etc.). For example, if the user's role is determined to be a manager of an employee, the employee's content server workspace is updated to include the user as a member of the manager role. If the manager role is permitted for editing in the content server, the user can edit content in the employee's content server workspace.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 7 depicts a diagrammatic representation of an example of a user interface of a content server workspace according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
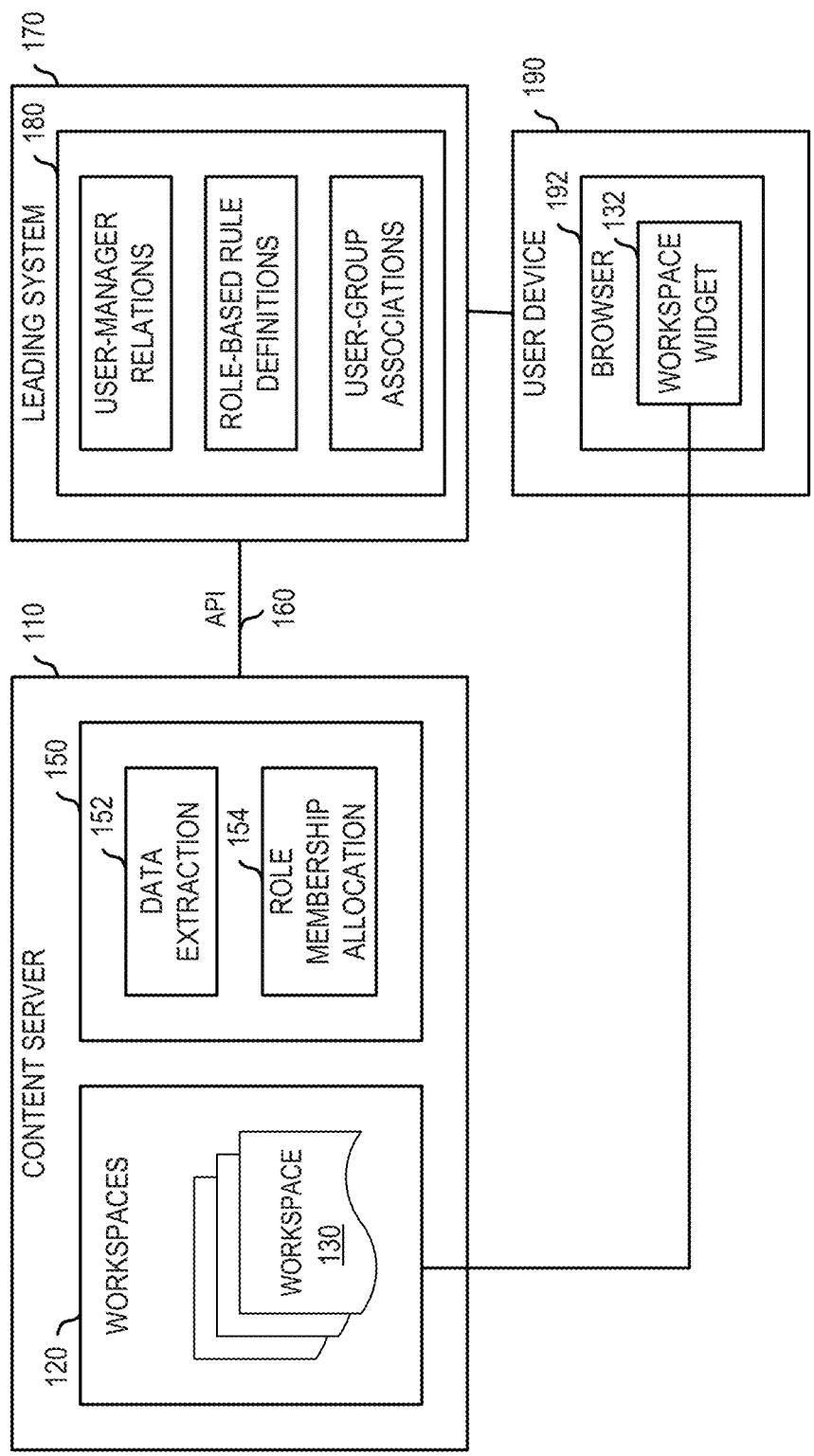
FIG. 1 depicts a diagrammatic representation of an example network computing environment where embodiments disclosed herein can be implemented.

FIG. 1 depicts a diagrammatic representation of an example network computing environment 100 where embodiments disclosed herein can be implemented. In this example, network computing environment 100 has a content server 110 and a leading system 170. As an example, content server 110 may implement OpenText™ Extended ECM Platform and leading system 170 may implement an SAP® business application such as SAP SuccessFactors®, which is a cloud-based HR system.

Although not shown in FIG. 1, leading system 170 can include core HR modules such as payroll, employee benefits, time off and record keeping; talent management modules such as employee performance management, compensation management, succession management, learning, recruiting, onboarding, workforce planning, and workforce analytics; and employee engagement tools such as collaboration and social media. In the example of FIG. 1, leading system 170 is shown to have a permission management module 180 that manages and maintains permission information such as user-manager relations, role-based rule definitions (or rules), and user-group associations for users of leading system 170. As a non-limiting example, permission management module 180 can be part of SAP SuccessFactors® Employee Central (which has a suite of HR applications).

In the example of FIG. 1, as a cloud-based system, leading system 170 is accessible by a user through a browser application 192 running on a user device 190. In some cases, leading system 170 may be integrated with an information management solution provided by content server 110. While leading system 170 can, to some extent, allow its users to create and store certain documents (e.g., employee records, leave request forms, etc.), at its core, leading system 170 manages relationships and not documents. In an enterprise setting, users of leading system 170 must deal with large volumes of enterprise content, including correspondences, various types of documentation, contracts, records, and so on. The information management solution provided by content server 110 can be leveraged by leading system 170 to capture, manage, store, preserve, and deliver the large volumes of enterprise content to the right user, at the right place, and at the right time.

For instance, the information management solution provided by content server 110 may include a content server workspace widget 132 that can be presented to a user of leading system 170 as part of a web-based user interface (UI) of leading system 170 running within browser 192 on user device 190. As an example, through UI integration between content server 110 and leading system 170, content server workspace widget 132 may be presented as a "tile" or icon on a user's SAP application launch pad or home page.

As illustrated in FIG. 1, content server workspace widget 132 is supported by content server 110. In this disclosure, content server 110 can provide a rich set of features and a central repository in an enterprise computing environment. Examples of content server features can include, but are not limited to, document management, content navigation, search, editor, workflow, collaboration, content reporting, etc. In the example of FIG. 1, content server 110 also provides a special feature 120 referred to herein as "workspaces." OpenText™ Connected Workspaces is an example of workspaces 120. Users of content server 110 can access these features through a UI of content server 110. Content server 110 has its own permission management that manages access privileges of users of content server 110. The role-based permission integration solution disclosed herein does not change how content server 110 manages permissions for its users.

A workspace can be considered a type of container in which documents and other content objects can be stored, managed, and accessed. There can be different types of workspaces (e.g., enterprise workspaces, employee workspaces, etc.). Responsive to content server 110 extending ECM to leading system 170, users of leading system 170 are provided with workspaces 130 which they can access through workspace widget 132. For example, when an employee is hired and entered into leading system 170, an employee workspace can be created in content server 110 for the new hire. An employee workspace can be used by an enterprise employee to work and aggregate associated data, content, people, and tasks to a common function, for instance, a project, or even a community of people with common interests. Workspace templates can ensure that folders, metadata, records management, and permissions are automatically created and applied in the background and can provide enhanced deployment flexibility, helping enterprise information technology (IT) specialists to better align ECM to the needs of their enterprise, making end users more effective and improve overall system performance.

As discussed above, when a workspace is created in content server 110 (e.g., using an employee workspace template with an associated predefined "manager" role) for a user of leading system 170, role-based permission membership, among others, can be automatically calculated and applied in the background by content server 110 using permission information synchronized from leading system 170. The predefined role "manager" specifies what a member of this role is allowed to do with the content in the employee workspace (e.g., "manager" is allowed to view and edit documents created by "employee" created in the employee workspace). It is not impossible for a user to manually create a workspace and also manually grant permissions to another user to access that workspace. However, this is not a scalable solution and can be very time consuming, costly, inefficient, and possibly error-prone. For example, the amounts of efforts, resources, and time needed for an enterprise with hundreds of thousands of employees to manually assign proper permissions to all of their workspaces is enormous (e.g., involving millions of data sets). Further, in some cases, rules and regulations (e.g., data protection laws, privacy laws, etc.) may require careful scrutiny on the accuracy and completeness of permissions thus granted. Granting the right permissions to all the right people to the right workspaces can be a very complex problem. Automating such a process is an even bigger challenge.

One reason is that content server 110 and leading system 170 are fundamentally very different systems—they are designed for different purposes, have very different functions, and operate independently and distinctly from one another. For example, leading system 170 implements a security framework in which permissions are granted based on permission roles. A permission role refers to a group of permissions assigned by an HR system administrator to a certain role in an enterprise (e.g., HR administrator, HR manager, manager, department head, director, etc.). Each permission role has a defined set of permissions to access employee data (e.g., data about employees such as their names, hire dates, titles, office locations, addresses, etc.). Users (e.g., users in a granted group) with permissions (e.g., permissions assigned to a permission role) are applied against other user (e.g., users in a target group). That is, a granted user is one who is permitted to access certain employee data and a target user is an employee to whom a granted user has access. This relationship can be diagramed as follows:

Granted User→Role→Target Users

Table 1 below provides a non-limiting example of a role "HR-Partner-GBL01" and its associated granted group "HRP-GBL001-TX-BEV" and target group "Texas Beverages."

In leading system 170, this role-based security framework allows HR administrators to automate permissions assigned to individual contributors, managers, HR managers, HR partners, custom managers, second managers, home managers, everyone, etc. Within leading system 170, a variety of relationships (e.g., A is a manger of employee B) and attributes (e.g., criteria such as "works at work location <attribute>") can be used to create different groups, for instance, by division, department, location, city, state, country, job code, name, hire date, title, etc. Multiple attributes can be combined to create a group of particular users (e.g., users in Germany who are department directors).

The levels of permissions that can be granted to a role can vary greatly, for instance, from access rights at the module level (e.g., right to access an HR module or submodule) to access rights at the field level (e.g., right to view, edit, correct, and/or delete a field in an employee record). Users in a granted group (i.e., granted users) can access and perform permissions selected on a target group. For instance, all HR managers in the U.S.A. (which represent granted users in a granted group) are assigned manager permissions (which are permissions assigned to a "manager" permission role) which grant them the right to edit employee files for all employees (which represent users in a target group) that they manage. In FIG. 1, these pieces of permission information (e.g., the relationships among the HR managers and the employees that they manager, the role-based rule definitions specifying how permissions apply, and the associations between users (e.g., HR managers and employees) and groups (e.g., granted groups and/or target groups)) are collectively referred to as permission information. In the example of Table 1, users in the granted group "HRP-GBL001-TX-BEV" are HR partners and, based on the role "HR-Partner-GBL01," these HR partners (granted users) are permitted to view and approve requests from users in the target group "Texas Beverages."

Although leading system 170 is capable of managing permissions based on roles and relationships among its users (e.g., HR managers, HR administrators, employees, etc.), it is currently unable to provide document type access by role. Content server 110, however, allows permissions to be configured based on document types. In some embodiments, content server 110 provides at least the following permission models on employee documents:

folder based permission model; and document type based permission model.

Table 2 below provides a non-limiting example of document types that can be configured in content server 110 (but is currently not available in leading system 170).

TABLE 1

| | | Granted Group | | Target Group | |
| --- | --- | --- | --- | --- | --- |
| Role | Description | Granted Group Description | Additional Detail (Attributes) | Target Group Description | Additional Detail (Attributes) |
| HR-Partner-GBL01 | HR Partner - To View and Approve | HRP-GBL001-TX-BEV | Attribute Position ID John Doe 40128883, Position P00013131 | Texas Beverages | XL-ARG0005 XL-COL0013 XL-CHL0032 XL-VEN0008 XL-COL0017 |

TABLE 2

| Document Template | Folder | Subfolder | Classification | Roles | Validity (month) | Required | |
|---|---|---|---|---|---|---|---|
| Employee Workspace Europe [select] | 020 Personal Information [select] | 020.020 Medical Check [select] | Disability Leave [select] | HR-Partner-GBL01 | 12 | True [select] | [delete] |
| Employee Workspace Europe [select] | 020 Personal Information [select] | 020.040 Employee Master Data [select] | Disability Classification | Employee | 12 | False [select] | [delete] |

In some embodiments, content server 110 can extend ECM to leading system 170. It would be very desirable to have an automatic way for content server 110 to leverage the permission information that leading system 170 already has and apply the role-based permissions already set up in leading system 170 to workspaces 130 in content server 110. In this way, a set of roles can be automatically defined in content server 110 per employee workspace type and every employee workspace in content server 110 can have its own list of members per role, providing seamless role-based permission integration between two otherwise very different systems.

To this end, in some embodiments, content server 110 can include a permission synchronization module 150 communicatively connected to leading system 170 over leading system API 160. In some embodiments, leading system API 160 may implement the Open Data Protocol (Odata), which is an open protocol that allows the creation and consumption of queryable and interoperable RESTful APIs. Permission synchronization module 150 of content server 110 may communicate (e.g., periodically, on demand, responsive to a triggering event, etc.) with permission management module 180 of leading system 170 through leading system API 160.

In some embodiments, permission synchronization module 150 has two main functions: data extraction 152 and role membership allocation 154. As explained in detail below, data extraction 152 is operable to synchronize permission information (e.g., the user-manager relations, role-based rules, and user-group associations) from permission management module 180 of leading system 170. The synchronized permission information is used by role membership allocation 154 to determine appropriate role memberships for workspaces 130.

Figure 2:
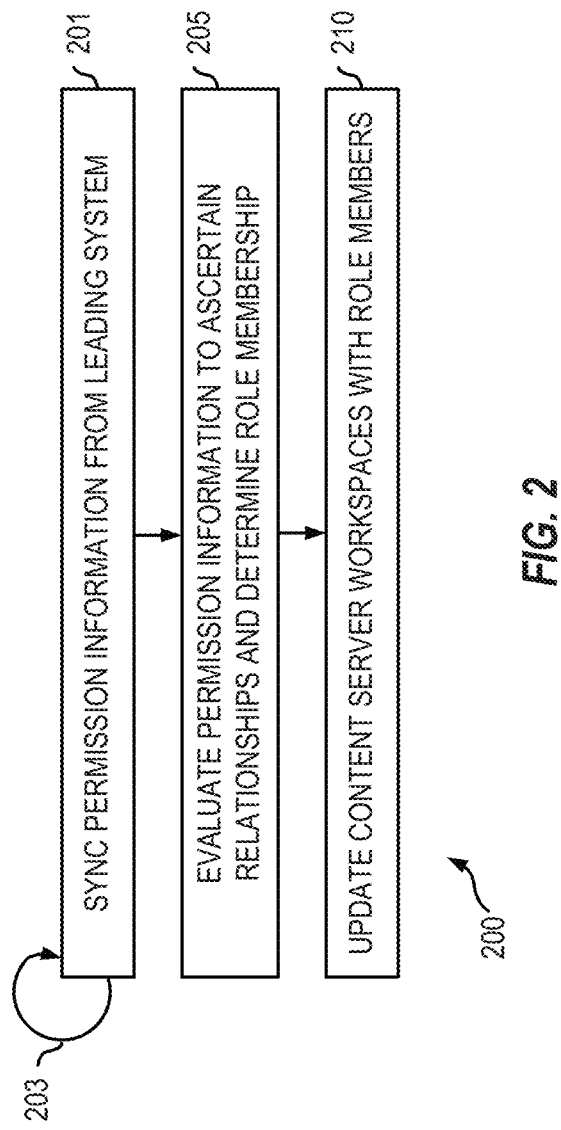
FIG. 2 depicts a flow chart illustrating an example of a method for role-based permission integration between a leading system and a content server according to some embodiments.

FIG. 2 depicts a flow chart illustrating an example of a method 200 performed by permission synchronization module 150 of content server 110 for role-based permission integration. In some embodiments, method 200 may comprise syncing, by a content server (e.g., permission synchronization module 150 of content server 110), permission information with a leading system communicatively connected to the content server (201). As discussed above, this communication can be accomplished through an API provided by the leading system.

In some embodiments, the permission information may include user-manager relations, role-based rules, and user-group associations, which are defined, managed, and maintained by the leading system's permission management component. Syncing permission information with the leading system allows the content server to replicate the leading system's most up-to-date permission information on user-manager relations, role-based rules, and user-group associations. In this way, the content server does not need to recreate permission information from scratch and/or to separately and additionally maintain permission information for users of the leading system (in addition to the content server's own permission management with static permission definitions). Rather, the content server can leverage the permission roles, the granted groups, and the target groups and their relationships that have already been set up and maintained in the leading system and automatically calculate role memberships based on permission information synced from the leading system.

To keep the synchronized permission information "fresh," in some embodiments, the permission synchronization module may operate to sync the permission information with the leading system at a scheduled time interval (periodically), on demand, or responsive to triggering event (203) such as the leading system adding a new user (e.g., a new employee) or the content server changing a user's permission to access another user's content server work space (e.g., a team leader moving from one team to another).

In some embodiments, the method may further include evaluating the permission information (which is in sync with the permission information maintained by the leading system) to ascertain relationships among users of the leading system (which can also be users of the content server) and determine role memberships for these users (205). In some embodiments, the evaluating step is performed by role membership allocation 154 of permission synchronization module 150. In some embodiments, role membership allocation 154 automatically assigns users in a granted group of the leading system as members to the roles of the right employee workspaces in the content server. This means that just the employee workspaces that fit to the employees determined by the target group will receive a particular granted group assignment. Referring to the example of Table 1, role membership allocation 154 is operable to automatically assign users in the granted group "HRP-GBL001-TX-BEV" as members of the "HR Partner—To View and Approve" (HR-Partner-GBL01) role. In this case, just the employees belonging to the target group "Texas Beverages" will receive this granted group assignment to their workspaces.

As discussed above, the permission information can include user-manager relations, role-based rules, and user-group associations. User-manager relations may include relationship information that describes a first user as a manager or administrator of a second user. This relationship information helps identifying users in a relationship and thus helps identifying role member candidates such as managers and/or administrators. In some embodiments, relationship based roles can be filled automatically. For example, a manager of an employee in the leading system can be automatically assigned as a member of the role "manager" to the employee's workspace in the content server.

Role-based rules may include rule definitions associated with the roles defined in the leading system. Such role-based rules define and govern the relationships between granted and target groups. User-group associations may describe how one user group is associated with another group (e.g., a particular granted group such as a group of managers and/or administrators in an enterprise's office in North America is associated with a particular target group such as a group of employees working in the same office in North America).

Results from the evaluation of these complex relationships can be utilized by the content server to assign the right people to the right roles in the employee workspaces. For example, suppose leading system 170 has information on a group of managers and a group of employees. A rule applicable to the role of "manager" states that every manager has a specific permission to edit the position and salary of any employee that they manage. Another rule states that a granted group of people (e.g., HR Admin in Germany) has access to a target group of employees in Germany and can modify the employees' timesheets. Role membership allocation 154 can evaluate such role-based rules synced from leading system 170 and map or otherwise connect them to rules defined in the content server. Since employee timesheets are of a particular document type in content server 110, role membership allocation 154 can resolve that everyone in the granted group can edit documents having the document type associated with employee timesheets. That is, in leading system 170, "role" determines the level of access on employee data (e.g., name, title, position, etc.), while in content server 110, "role" determines the level of access on employee documents (e.g., timesheets, leave requests, presentations, reports, etc.).

By evaluating the permission information synced from leading system 170, role membership allocation 154 can understand what level of access to employee data a granted group is permitted with respect to a target group in leading system 170 and applies the appropriate permission model of content server 110 on employee documents managed by content server 110. Following the above example rules, if User M is in the granted group, User M can edit the timesheet data of User E because User E is in the target group. Because User M is in the granted group and because the rule states that this granted group can edit User E's employee data, role membership allocation 154 can operate to determine User M's membership of a content server role and allocate User M to User E's employee workspace in the content server according to the content server role thus determined. This process is referred to herein as role membership allocation.

Referring to FIG. 2, once a user's role membership in the content server is determined based at least in part on the role-based rules synced from the leading system, the method may further include updating a content server workspace (210) such that the user, based on the user's role membership thus determined, can access the content server workspace as permitted (e.g., view only, edit, etc.) by the user's role membership in the content server. For example, if the user's role is determined to be a manager of an employee, the employee's content server workspace is updated to include the user as a member of the manager role. If the manager role is permitted for editing certain type(s) of documents in the content server, the user can edit documents of such type(s) in the employee's content server workspace.

Figure 3:
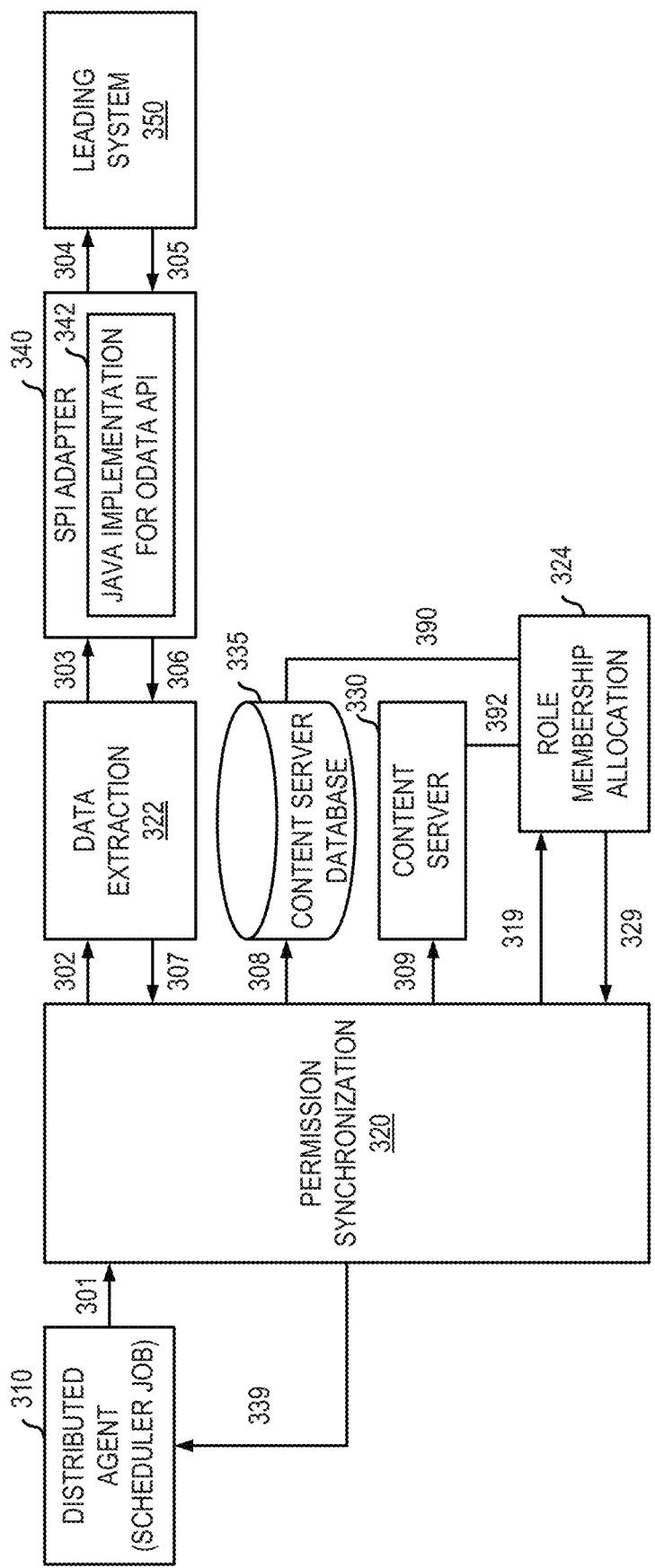
FIG. 3 depicts a flow diagram illustrating an example of a process flow initiated by a distributed agent for role-based permission integration between a leading system and a content server according to some embodiments.

The method described above can be invoked in many ways. As an example, FIG. 3 depicts a flow diagram illustrating a process flow 300 initiated by a distributed agent 310 for role-based permission integration between a leading system and a content server. In some embodiments, Permission synchronization jobs can be scheduled and performed by distributed agents according to a predetermined schedule.

In the example of FIG. 3, process flow 300 begins with distributed agent 310 instructing a permission synchronization module 320 to begin a flow of information (301). Permission synchronization module 320 makes a call to a data extraction component 322 to get permission information from a leading system 350 (302). In turn, data extraction component 322 makes a call to a Java layer 342 through a service provider interface (SPI) adapter 340 (303). SPI is an API that can be implemented or extended by a third party (which, in this case, is represented by leading system 350). Java layer 342 includes a Java implementation (SPI) for the Odata API described above. The SPI interfaces data extraction component 322 and the Odata API of leading system 350. An interface in the Java programming language is a reference type and is implemented, rather than instantiated. Java interfaces and Java implementations are known to those skilled in the art and thus are not further described herein.

SPI adapter 340 sends an API request to the Odata API of leading system 350 (304) and receives a response from the Odata API of leading system 350 (305). As a non-limiting example, the response from leading system 350 can be in JavaScript Object Notation (JSON), which is a lightweight data-interchange format. The response (e.g., a JSON object) is sent back to data extraction component 322 (306). In one embodiment, group associations can be provided in the form of an ad-hoc report and user-manager relations and role-based rules can be provided in the form of Odata.

In turn, data extraction component 322 sends the response back to permission synchronization module 320 (307). In some embodiments, permission synchronization module 320 persists permission information contained in the response in a content server database 335 (308). The persisted permission information can include the user-manager relations, role-based rules, etc. received from leading system 350. In some embodiments, permission synchronization module 320 also updates a content server 330 with user-group associations (309) that permission synchronization module 320 has learned from the permission information synced from leading system 350.

In some embodiments, permission synchronization module 320 calls its role membership allocation component 324 to perform role membership allocation on the new persisted data (permission information) (319). In response, role membership allocation component 324 contacts content server database 335 (390) and requests the newly persisted data for its role membership calculation. Role membership allocation component 324 then performs the role membership allocation as described above with reference to FIG. 2 (e.g., evaluating complex relationships, role-based rules, user-group associations, etc. indicated in the permission information) and updates content server workspaces in content server 330 with role members (392). Once updates to content server 330 are complete, role membership allocation component 324 returns control of process flow 300 to permission synchronization module 320 (329). In turn, permission synchronization module 320 returns control of process flow 300 back to distributed agent 310 to exit the job execution (339).

As a non-limiting example, permission synchronization module 320 and its data extraction component 322 can be implemented on the Oscript layer of content server 330. Oscript is a Java-like scripting language for the development of Open Text Content Server.

As discussed above, in performing the complex evaluation for role membership allocation in the content server, the role membership allocation component may map or otherwise connect permission information synced from the leading system (e.g., user-manager relations, role-based rules, user-group associates, etc.) to the permission information already in the content server (e.g., users, roles, rules, etc.). To this end, FIG. 4 depicts an example of how user-manager relations, role-based rules, and user-group associations are related in a leading system and FIG. 5 depicts an example of how user-manager relations, role-based rules, and user-group associations in a leading system can be logically mapped to the roles, users, and permission model in the content server so as to allocate role memberships and appropriately and automatically assign granted group users to the content server workspaces of target group users.

Figure 4:
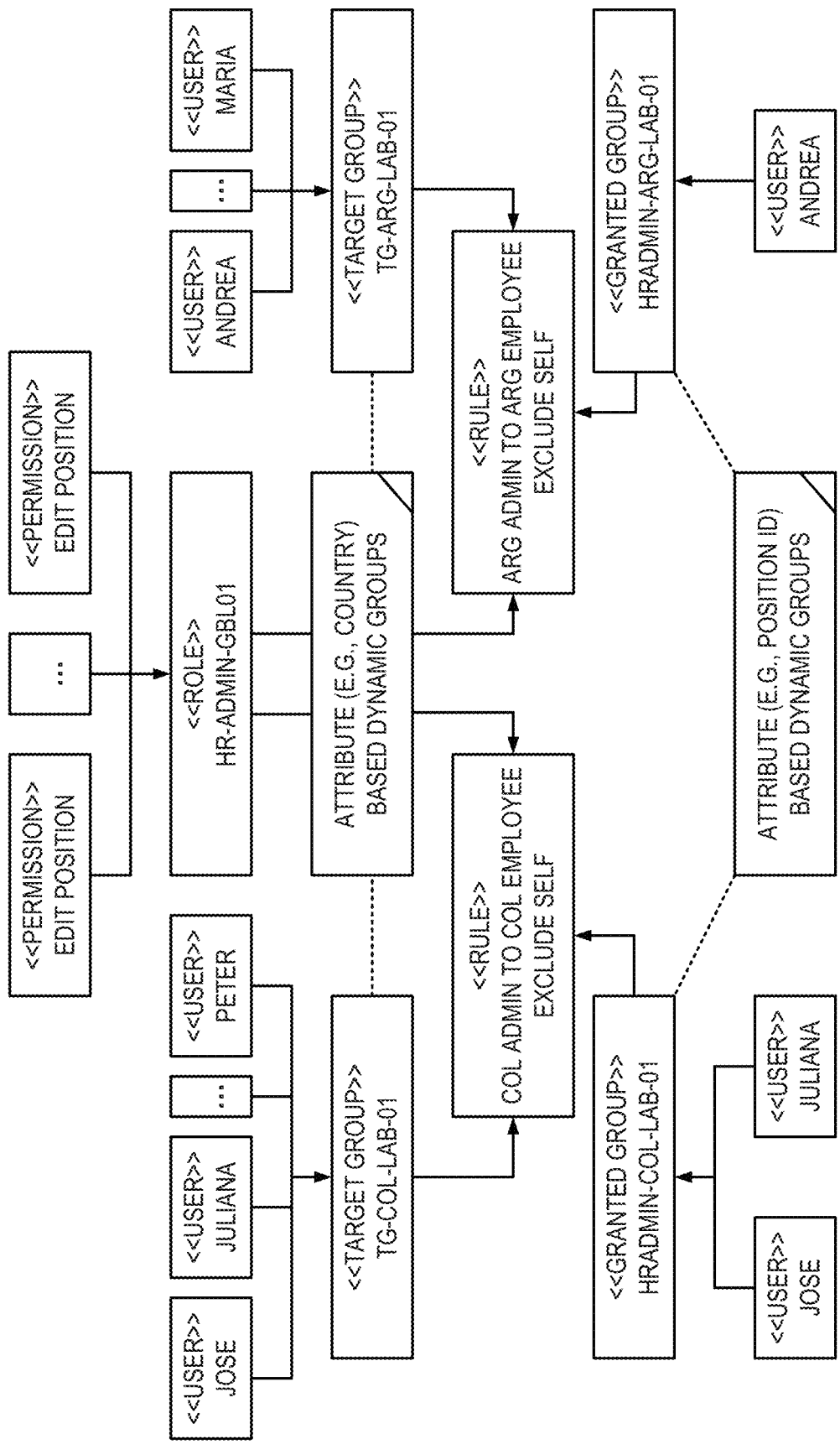
FIG. 4 depicts an example of how user-manager relations, role-based rule definitions, and user-group associations are related in a leading system.

In the example permission scheme 400 for a leading system shown in FIG. 4, permissions are role-driven and not specific to any document type. Rather, relationships between users are governed by groups to which they belong (e.g., granted versus target) and relationships between granted and target groups are defined by role-based rules. The role membership allocation component described above is operable to evaluate these complex relationships and role-based rules applicable to such relationships and map (allocate) granted users to the workspaces of their target users. As it can be seen in the example logical mapping 500 shown in FIG. 5, each granted user's association with their respective granted group and their particular role remain the same as what they have in the leading system (e.g., User Jose still belongs to the group "HRADMIN-COL-LAB-01" in the role of "HR-ADMIN-GBL01"). However, in the content server, each (granted) user is appropriately mapped and assigned to the right employee workspaces of their employees (e.g., User Jose is assigned to User Peter's workspace) and their permissions are now governed by rules pertaining to document type(s) associated with the respective workspaces. For example, in permission scheme 400, User Jose has permission to edit User Peter's position (an example of employee data in the leading system) as defined by the role-based rule, but in logical mapping 500, User Jose has permission to add and delete content in User Peter's workspace in the content server (per one of the permission models such as the document type based permission model. provided by the content server). Content server permissions are not modified or otherwise affected by the role membership allocation process.

In some embodiments, the content server may utilize a configuration file that defines what leading system role is mapped to which content server role. For instance, the configuration file may describe which roles on the leading system side are actually manager roles on the content server side, and which roles on the leading system side would be HR admin roles on the content server side. The content server does not need to integrate any specific permission model of the leading system, so long as the content server can map the many different leading system roles to two content server roles (manager and administrator) so that role memberships of employee workspaces can be automatically assigned. The three functional roles (manager, administrator, and employee) are well defined in the content server. For example, if a user is considered a manager for another user, then the manager has the read/write privilege over his employees. If a user is considered an employee, then he does not have access to manager information. An administrator, on the other hand, may have access to some documents or folders that even the mangers are not allowed to view. The configuration file may define what each functional role is allowed to view and/or modify in an employee workspace in the content server.

Figure 5:
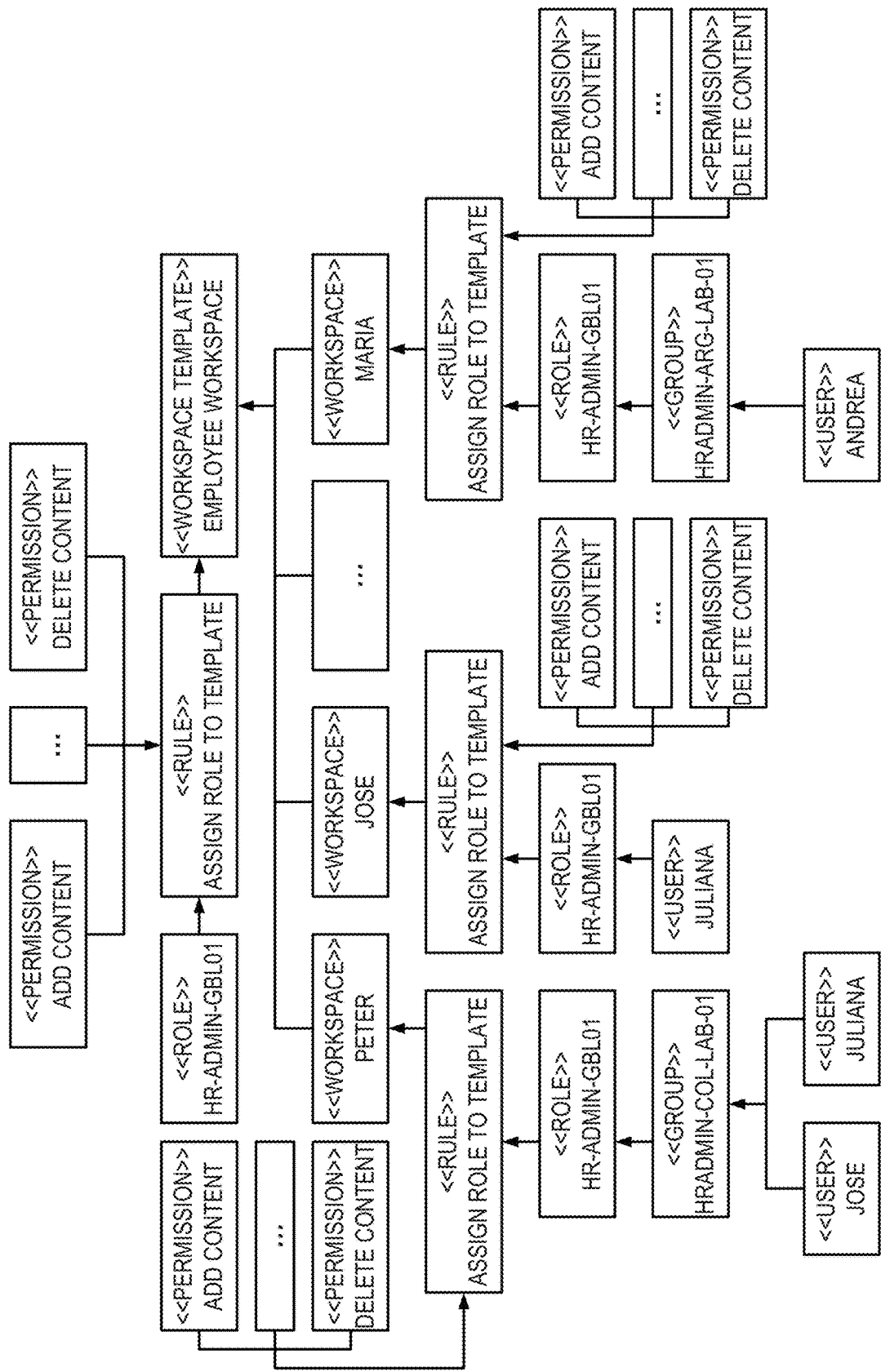
FIG. 5 depicts an example of how user-manager relations, role-based rule definitions, and user-group associations in a leading system can be used to allocate role memberships and appropriately and automatically assign granted group users to the content server workspaces of target group users according to some embodiments.
Figure 6:
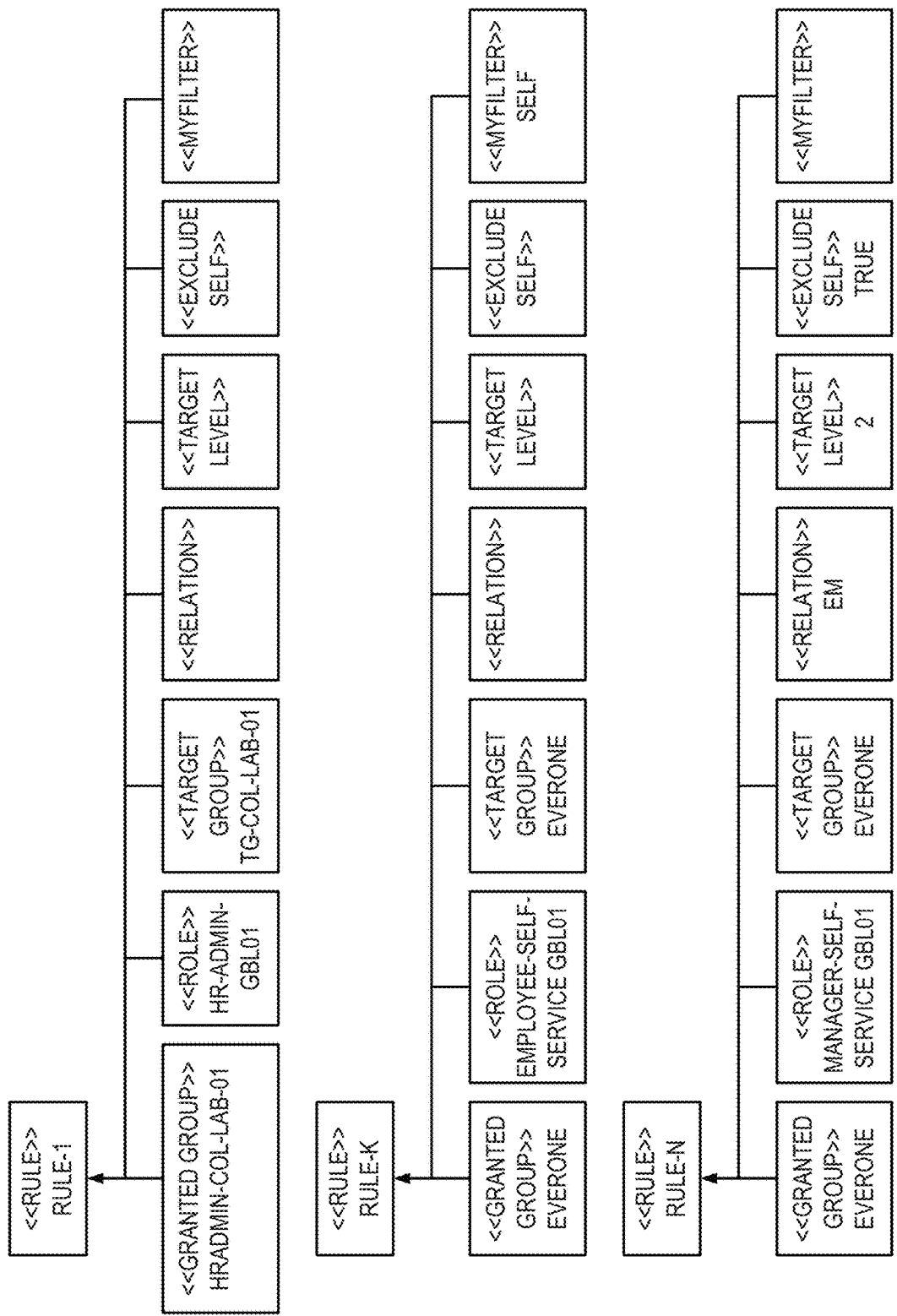
FIG. 6 depicts an example of rule sets for role membership allocation according to some embodiments.

Skilled artisans appreciate that the example permission scheme shown in FIG. 4 and the logical mapping of FIG. 5 are exemplary and non-limiting and that relationships, roles, and role-based rules can be very complex in a leading system, an example of which is illustrated in FIG. 6. Even so, the role membership allocation component of the permission synchronization module disclosed herein can evaluate these complex relationships, roles, and role-based rules defined in a leading system and automatically assign granted users (e.g., users in a granted group as having access on employee data) to the employee workspaces of users (who are target users in a target group defined in the leading system as having employee data accessible by the granted users in the granted group) in the content server in a seamless manner.

In the content server, a set of roles is defined per employee workspace type. As discussed above, content server roles have different levels of access to different kinds of data than those of leading system roles. In the content server, every employee workspace has its own list of members per role. Role members can be automatically assigned and added to an employee workspace by the role membership allocation process described above. This process is also referred to as automated mapping for permission integration. Once added through this process, the employee can view the newly added role member through their employee workspace.

Figure 7:
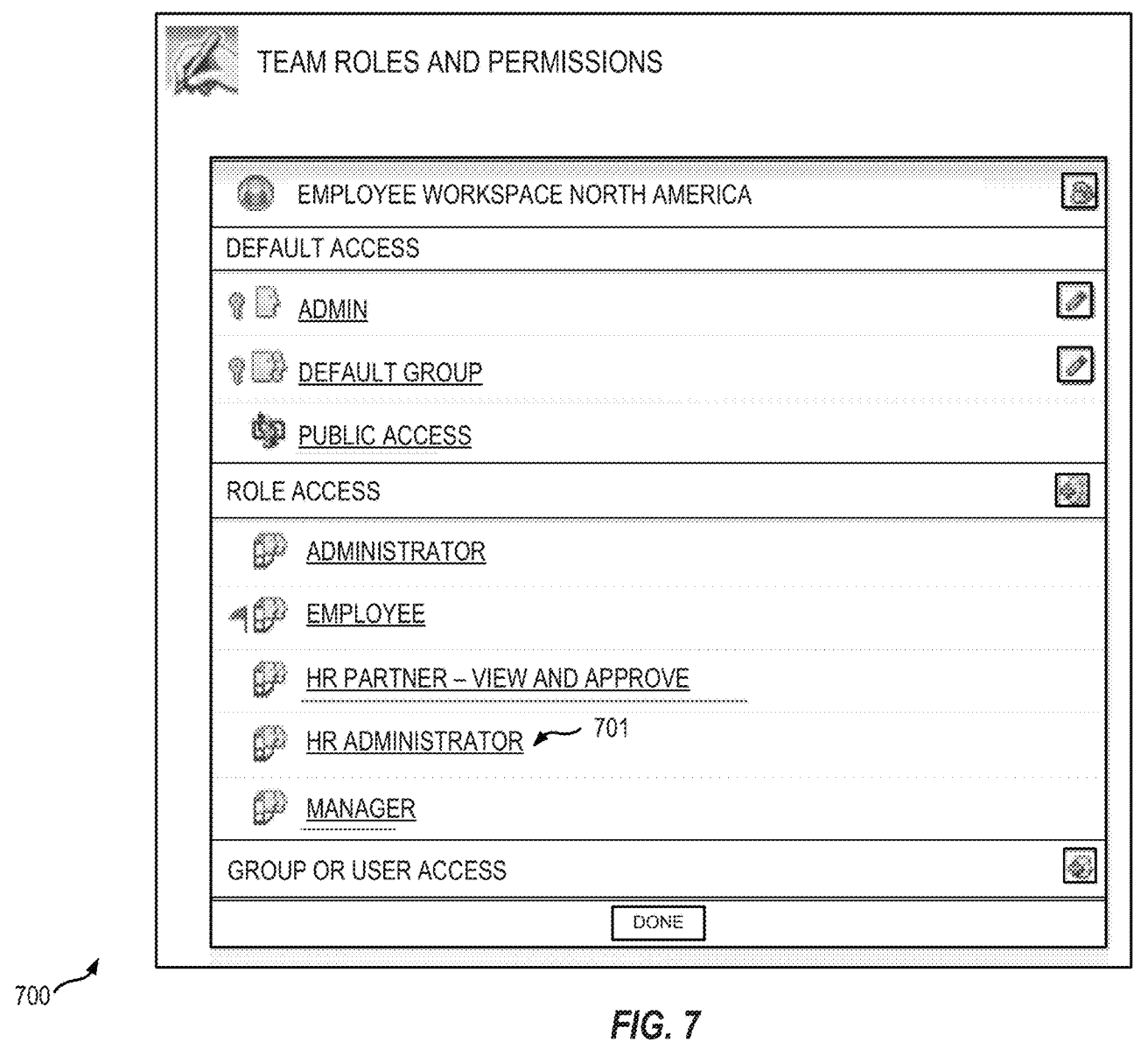

FIG. 7 depicts a diagrammatic representation of an example of a user interface 700 of a content server workspace according to some embodiments. Following the above example, after User Jose is added to User Peter's employee workspace (see FIG. 4, per User Jose's role as an HR administrator in the granted group of HR administrators), User Jose's name is displayed when User Peter selects to view HR administrators 701.

The content server can continuously monitor and update workspace role memberships whenever necessary. In some embodiments, the content server may run a job regularly (e.g., periodically) to identify any change in a leading system and update a corresponding content server workspace role affected by the change in the leading system. For example, suppose Tom is Andrea's manager in a leading system. Initially, when ECM is extended to the leading system, Tom is automatically assigned by the content server to the manager role for Andrea's employee workspace and granted permissions by the content server to view and edit documents created in Andrea's employee workspace in the content server. Suppose there is a change in the leading system and now Andrea reports to Freddie. This change can be detected by the content server which triggers a process flow for role-based permission integration as described above (e.g., process flow 300). The updated permission information (which includes the updated user-manager relations among Tom, Andrea, and Freddie) is provided by the leading system through permission synchronization. The content server (or, more specifically, the role membership allocation component described above) is operable to analyze these changes and update the role membership of Andrea's employee workspace automatically by removing Tom from the manager role associated with Andrea's employee workspace and adding Freddie to the manager role in Andrea's employee workspace.

In some embodiments, the content server may run a job regularly (e.g., periodically) to identify any new employee that has been added in a leading system. If so, the content server creates a new employee workspace (e.g., using the employee workspace that has an associated manager role and a defined permission model) and starts a process flow for role-based permission integration as described above. In some embodiments, the content server may query the leading system (through the leading system's API) for a user collection entity which can return, for instance, a list of new users (or, in the above example, users who have any changes such as Andrea whose manager has changed). The content server can then calculate a role membership for each newly created employee workspace as described above. Realistically, group membership definitions can also change regularly. Accordingly, the content server may run a job regularly (e.g., periodically) on the leading system to check whether any role-based rule definitions have changed in the leading system and, if so, fetch changes and any new rule definitions from the leading system and update the rule definitions persisted in the content server database.

Through the workspace widget discussed above, workspaces can be used to extend ECM to a leading system. By leveraging relationships and permissions managed by the leading system, embodiments disclosed herein can connect unstructured content managed by the content server with structured data from the leading system, integrate the permissions in a seamless manner, and provide a single point of view of all information related to a specific project (e.g., a potential customer, a proposal, an invoice, etc.), while eliminating the need to individually and manually adding managers and administrators alike to individual employee's workspace, significantly reducing the amount of time, costs, and resources needed for permission integration.

Figure 8:
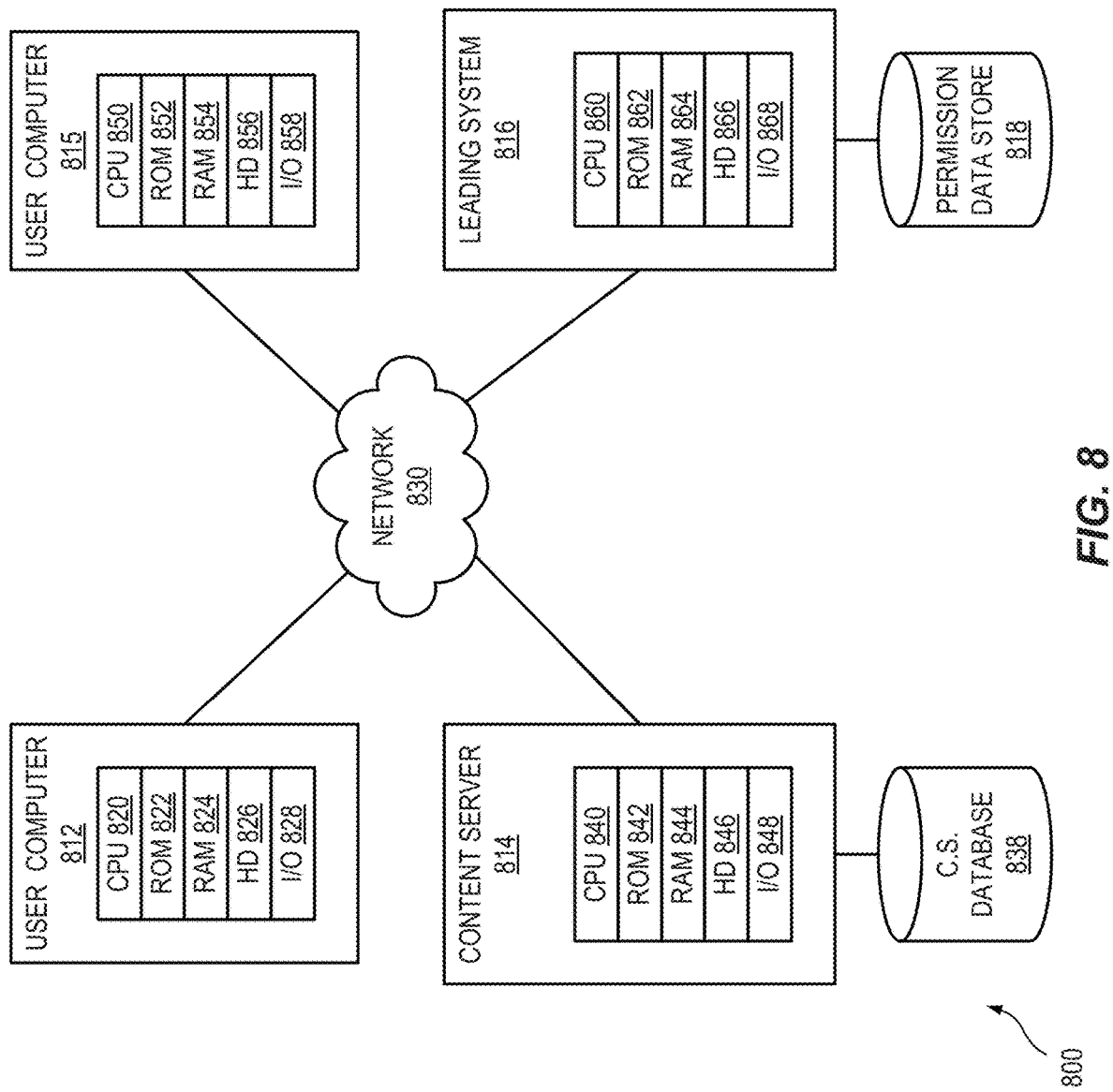
FIG. 8 depicts a diagrammatic representation of a distributed network computing environment where embodiments disclosed can be implemented.

FIG. 8 depicts a diagrammatic representation of a distributed network computing environment where embodiments disclosed can be implemented. In the example of FIG. 8, network computing environment 800 may include network 814 that can be bi-directionally coupled to user computer 812, user computer 815, content server 814, and leading system 816. content server 814 can be bi-directionally coupled to content server database 838 and leading system 816 can be bi-directionally coupled to permission data store 818. Network 830 may represent a combination of wired and wireless networks that network computing environment 800 may utilize for various types of network communications known to those skilled in the art.

For the purpose of illustration, a single system is shown for each of user computer 812, user computer 815, content server 814, and leading system 816. However, within each of user computer 812, user computer 815, content server 814, and leading system 816, a plurality of computers (not shown) may be interconnected to each other over network 830. For example, a plurality of user computers may be communicatively connected over network 830 to content server 814 that operates an ECM system in an enterprise computing environment and a plurality of user computers may be communicatively connected over network 830 to leading system 816 implementing an HR system.

User computers 812 may include data processing systems for communicating with content server 814. Likewise, user computers 815 may include data processing systems for communicating with leading system 816.

User computer 812 can include central processing unit ("CPU") 820, read-only memory ("ROM") 822, random access memory ("RAM") 824, hard drive ("HD") or storage memory 826, and input/output device(s) ("I/O") 828. I/O 829 can include a keyboard, monitor, printer, electronic pointing device (e.g., mouse, trackball, stylus, etc.), or the like. User computer 812 can include a desktop computer, a laptop computer, a personal digital assistant, a cellular phone, or nearly any device capable of communicating over a network. User computer 815 may be similar to user computer 812 and can comprise CPU 850, ROM 852, RAM 854, HD 856, and I/O 858.

Content server 814 may include CPU 840, ROM 842, RAM 844, HD 846, and I/O 848 and leading system 816 may include CPU 860, ROM 862, RAM 864, HD 866, and I/O 868. Content server 814 and leading system 816 may each include one or more modules and UIs configured for providing services to user computers 812 and 815 over network 830. Many other alternative configurations are possible and known to skilled artisans.

Each of the computers in FIG. 8 may have more than one CPU, ROM, RAM, HD, I/O, or other hardware components. For the sake of brevity, each computer is illustrated as having one of each of the hardware components, even if more than one is used. Each of computers 812, 814, 815, and 816 is an example of a data processing system. ROM 822, 842, 852, and 862; RAM 824, 844, 854, and 864; HD 826, 846, 856, and 866; and permission data store 818 and content server database 838 can include media that can be read by CPU 820, 840, 850, or 860. Therefore, these types of memories include non-transitory computer-readable storage media. These memories may be internal or external to computers 812, 814, 815, or 816.

Portions of the methods described herein may be implemented in suitable software code that may reside within ROM 822, 842, 852, or 862; RAM 824, 844, 854, or 864; or HD 826, 846, 856, or 866. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc.

Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
   syncing, by a first computer system, permission information with a second computer system communicatively connected to the first computer system, the first computer system and the second computer system having independent permission management functionalities, the permission information including:
      user-manager relations defined in the second computer system;
      role-based rule definitions defined in the second computer system; and
      user-group associations associating users of the second computer system with a granted group, a target group, or a combination thereof;
   evaluating, by the first computer system, the user-manager relations, the role-based rule definitions, and the user-group associations;
   identifying, by the first computer system based at least on the user-manager relations, a manager or administrator of a user in the second computer system; and
   automatically assigning the manager or administrator as a member of a manager or administrator role in a workspace of the user in the first computer system.

2. The method according to claim 1, wherein the syncing comprises making an application programming interface call to the second computer system.

3. The method according to claim 1, wherein the permission information has a lightweight data-interchange format.

4. The method according to claim 1, further comprising:
   persisting the permission information in a database accessible by the first computer system.

5. The method according to claim 1, further comprising:
   requesting, by the first computer system, the second computer system to provide a list of any users whose user-manager relations have changed in the second computer system; and
   initiating, by the first computer system, a process flow comprising the syncing, the receiving, the evaluating, the identifying, and the automatically assigning such that role memberships for workspaces of the users whose user-manager relations have changed in the second computer system are automatically updated in the first computer system.

6. The method according to claim 1, further comprising:
   requesting, by the first computer system, the second computer system to provide a list of new users added to the second computer system; and
   initiating, by the first computer system, a process flow comprising the syncing, the receiving, the evaluating, the identifying, and the automatically assigning such that role memberships for workspaces of the new users in the first computer system are automatically allocated.

7. The method according to claim 1, wherein users in the granted group in the second computer system have permissions to access user data of users in the target group through a second computer system role and wherein members of the manager or administrator role have permissions to access documents per document type configured in the workspace in the first computer system.

8. An enterprise content management system comprising:
   a processor;
   a non-transitory computer-readable medium; and
   stored instructions translatable by the processor to perform:
      syncing permission information with a computer system communicatively connected to the enterprise content management system, the enterprise content management system and the computer system having independent permission management functionalities, the permission information including:
         user-manager relations defined in the computer system;
         role-based rule definitions defined in the computer system; and
         user-group associations associating users of the computer system with a granted group, a target group, or a combination thereof;
      evaluating the user-manager relations, the role-based rule definitions, and the user-group associations;
      identifying, based at least on the user-manager relations, a manager or administrator of a user in the computer system; and
      automatically assigning the manager or administrator as a member of a manager or administrator role in a workspace of the user in the enterprise content management system.

9. The enterprise content management system of claim 8, wherein the syncing comprises making an application programming interface call to the second computer system.

10. The enterprise content management system of claim 8, wherein the permission information has a lightweight data-interchange format.

11. The enterprise content management system of claim 8, wherein the stored instructions are further translatable by the processor to perform:
   persisting the permission information in a first computer system database.

12. The enterprise content management system of claim 8, wherein the stored instructions are further translatable by the processor to perform:
- requesting the computer system to provide a list of any users whose user-manager relations have changed in the computer system; and
- initiating a process flow comprising the synching, the receiving, the evaluating, the identifying, and the automatically assigning such that role memberships for workspaces of the users whose user-manager relations have changed in the computer system are automatically updated in the enterprise content management system.

13. The enterprise content management system of claim 8, wherein the stored instructions are further translatable by the processor to perform:
- requesting the computer system to provide a list of new users added to the computer system; and
- initiating a process flow comprising the synching, the receiving, the evaluating, the identifying, and the automatically assigning such that role memberships for workspaces of the new users in the enterprise content management system are automatically allocated.

14. The enterprise content management system of claim 8, wherein users in the granted group in the computer system have permissions to access user data of users in the target group through a computer system role and wherein members of the manager or administrator role have permissions to access documents per document type configured in the workspace in the enterprise content management system.

15. A computer program product comprising a non-transitory computer readable medium storing instructions translatable by a first computer system to perform:
- syncing permission information with a second computer system communicatively connected to the first computer system, the first computer system and the second computer system having independent permission management functionalities, the permission information including:
  - user-manager relations defined in the second computer system;
  - role-based rule definitions defined in the second computer system; and
  - user-group associations associating users of the second computer system with a granted group, a target group, or a combination thereof;
- evaluating the user-manager relations, the role-based rule definitions, and the user-group associations;
- identifying, based at least on the user-manager relations, a manager or administrator of a user in the second computer system; and
- automatically assigning the manager or administrator as a member of a manager or administrator role in a workspace of the user in the first computer system.

16. The computer program product of claim 15, wherein the syncing comprises making an application programming interface call to the second computer system.

17. The computer program product of claim 15, wherein the permission information has a lightweight data-interchange format.

18. The computer program product of claim 15, wherein the instructions are further translatable by the first computer system to perform:
- requesting the second computer system to provide a list of any users whose user-manager relations have changed in the second computer system; and
- initiating a process flow comprising the synching, the receiving, the evaluating, the identifying, and the automatically assigning such that role memberships for workspaces of the users whose user-manager relations have changed in the second computer system are automatically updated in the first computer system.

19. The computer program product of claim 15, wherein the instructions are further translatable by the first computer system to perform:
- requesting the second computer system to provide a list of new users added to the second computer system; and
- initiating a process flow comprising the synching, the receiving, the evaluating, the identifying, and the automatically assigning such that role memberships for workspaces of the new users in the first computer system are automatically allocated.

20. The computer program product of claim 15, wherein users in the granted group in the second computer system have permissions to access user data of users in the target group through a second computer system role and wherein members of the manager or administrator role have permissions to access documents per document type configured in the workspace in the first computer system.

* * * * *